Patented June 13, 1939

2,162,203

UNITED STATES PATENT OFFICE 2,162,203

PREPARATION OF ANTHRAQUINONE VAT DYESTUFFS

Henry J. Weiland, Wilmington, Del., and Ralph N. Lulek, South Milwaukee, Wis., assignors to E. I. du Pont de Nemours & Company, Wilmington, Del., a corporation of Delaware No Drawing. Application December 7, 1936, Serial No. 114,638

1 Claim. (Cl. 260—316)

This invention relates to the preparation of new vat dyestuffs of the anthraquinone series. The invention has for its object the preparation of new and valuable diacidylamino-trianthrimides of the general formula

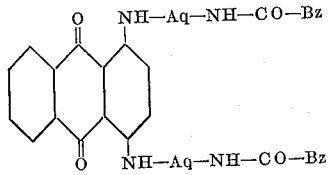

wherein Aq stands for an anthraquinone molecule to which the acidylamino radicals are attached in alpha positions, and Bz represents a radical of the benzene series.

A further object of the invention is to provide new and valuable vat dyestuffs from the trianthrimide compound identified by the above formula by treating the same with acid condensing agents such as aluminum chloride in nitrobenzene, to give what are considered to be trianthrimide carbazole vat dyestuffs. These new dyestuffs are exceptionally fast to light, bleach, kier boiling and washing, and dye cotton in strong shades ranging from olive-gray to brown. These new compounds make possible a variety of new shades in the anthraquinone vat dyestuff field.

These new compounds may be prepared by condensing 1,4-diaminoanthraquinone with 1-benzoylaminoanthraquinone containing in the 4,5,6,7 or 8 position a reactive halogen, preferably in an inert organic solvent, such as nitrobenzene, with subsequent ring-closure of the anthrimide so formed by the use of aluminum chloride. The final condensation by means of aluminum chloride may be effected in the same nitrobenzene solution in which the trianthrimide has been produced.

These compounds may also be prepared by condensing 1,4-dichloro- or dibromoanthraquinone with 1-benzoylaminoanthraquinone containing in the 4,5,6,7 or 8 position a free amino group. The resulting dyestuffs in both cases are identical. The anthrimide condensation and acid ring-closure are carried out by the known methods, the novelty of our invention residing in the preparation of new and valuable compounds by combining intermediates in a manner not heretofore contemplated by the prior art.

The following examples are given to more fully illustrate the invention. The parts used are by weight.

Example 1

10 parts of 1,4-diaminoanthraquinone, 30.5 parts of 1-benzoylamino-5-chloroanthraquinone, 12 parts sodium carbonate and 0.5 part cupric chloride are heated in 200 parts of nitrobenzene to boil for a period of 5-6 hours. The course of the condensation may be followed by observation of the formation of the dark needles of the trianthrimide. The condensation mass is then cooled to room temperature and 130 parts of ground aluminum chloride are added. The temperature rises during the addition to 60-70° C. The mass is then heated to 85-90° C. for a period of 1-1½ hours. After cooling to 20-30° C. the mass is drowned in a mixture of ice and water and stirred for several hours. The nitrobenzene is removed by steam distillation and the crude dyestuff filtered and washed with water. It may be purified by oxidation with an alkaline or acid oxidizing agent.

The dyestuff dyes in powderful reddish brown shades from a brown vat.

Example 2

10 parts 1,4-dichloroanthraquinone, 24.5 parts 1-benzoylamino-4-aminoanthraquinone, 15 parts potassium carbonate and 0.5 part cuprous chloride are heated in 200 parts nitrobenzene to 205-210° C. for 6-8 hours. After cooling the mass, 150 parts aluminum chloride are added and the temperature is raised to 85-90° C. for 2 hours. The reaction mixture is then cooled, drowned on ice and the nitrobenzene steam distilled. The crude dyestuff is filtered and washed with water and purified by oxidation with bichromate in dilute sulfuric acid. It dyes cotton in olive-gray shades.

Example 3

15.2 parts 1-benzoylamino-6-chloroanthraquinone, 5 parts 1,4-diaminoanthraquinone, 7 parts sodium carbonate and 0.2 part cuprous chloride are heated in 150 parts nitrobenzene to boil for 5 hours. The mass is then cooled, diluted with 100 parts nitrobenzene and 100 parts aluminum chloride are added in three portions. The temperature is raised to 65-70° C. and is adjusted at 90-95° C. and held for 1 hour. After cooling, the mass is drowned in ice water, stirred for 1 hour and then steam distilled.

After filtering, the new dyestuff is obtained as a black powder soluble in concentrated sulfuric acid with a dull violet color. It is soluble in an alkaline hydrosulfite vat with red bordeaux color and dyes cotton in gray shades.

Example 4

10 parts 1,4-diaminoanthraquinone and 30.5 parts 1-benzoylamino-8-chloroanthraquinone are heated in 250 parts trichlorobenzene with 0.5 part copper acetate and 14 parts sodium acetate to the boil for 10 hours. The resulting trianthrimide is filtered cold and the cake steam distilled. It dyes cotton in gray shades from a reddish vat and dissolves in concentrated sulfuric acid with a green color.

10 parts of this trianthrimide are suspended in 100 parts nitrobenzene and 50 parts aluminum chloride are added, allowing the temperature to rise to 60-70° C. The mass is then heated to 85-90° C. for ½ hour and cooled to room temperature. It is drowned in ice water and steam distilled free of nitrobenzene. The new carbazole derivative dyes cotton in olive shades from a red-brown vat and dissolves in concentrated sulfuric acid with a blue-brown color.

Tolylamino or other substituted benzoylaminoanthraquinones may be employed in place of the benzoylaminoanthraquinones specifically mentioned in the above examples.

We claim:
The aluminum chloride ring-closed product of the diacidyl-trianthrimide of the formula:

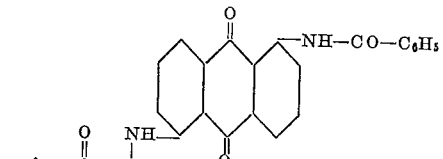
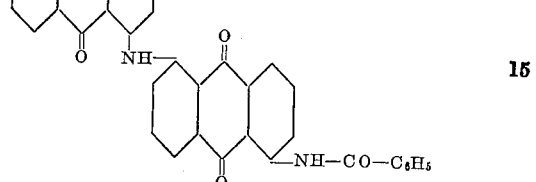

HENRY J. WEILAND.
RALPH N. LULEK.